United States Patent
Ng et al.

(10) Patent No.: US 8,522,180 B1
(45) Date of Patent: Aug. 27, 2013

(54) METHOD AND SYSTEM IDENTIFYING IP BLOCKS AND BLOCK SUPPLIERS FOR AN ELECTRONIC DESIGN

(75) Inventors: Jeffrey K. Ng, Cupertino, CA (US); Nozar Nozarian, Los Gatos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/534,364

(22) Filed: Jun. 27, 2012

(51) Int. Cl.
   *G06F 17/50* (2006.01)
(52) U.S. Cl.
   USPC .......................................... 716/110; 716/136
(58) Field of Classification Search
   USPC .................................................. 716/110, 136
   See application file for complete search history.

(56) References Cited

U.S. PATENT DOCUMENTS

| | | | |
|---|---|---|---|
| 6,687,710 B1* | 2/2004 | Dey | 705/36 R |
| 6,970,875 B1* | 11/2005 | Dey | 717/163 |
| 7,571,184 B2* | 8/2009 | Hekmatpour et al. | 1/1 |
| 8,156,453 B1* | 4/2012 | Nozarian et al. | 716/100 |
| 2004/0117374 A1* | 6/2004 | Hung et al. | 707/10 |

* cited by examiner

*Primary Examiner* — Naum Levin
(74) *Attorney, Agent, or Firm* — Vista IP Law Group, LLP

(57) ABSTRACT

An improved approach is described for identifying IP for an electronic design. The present approach can be used to handle situation where there may be difficulties in identifying which, if any, IP matches the desired requirements of an electronic design for which the IP is to be used or integrated. The search wizard of the present approach facilitates identification of IP for an electronic design. Expert systems and expert system services are provided for identifying IP blocks for an electronic design. Concierge-like services may be used to facilitate a connection between a consumer of electronic IP and the provider or vendor of the electronic IP in conjunction with the expert services.

37 Claims, 11 Drawing Sheets

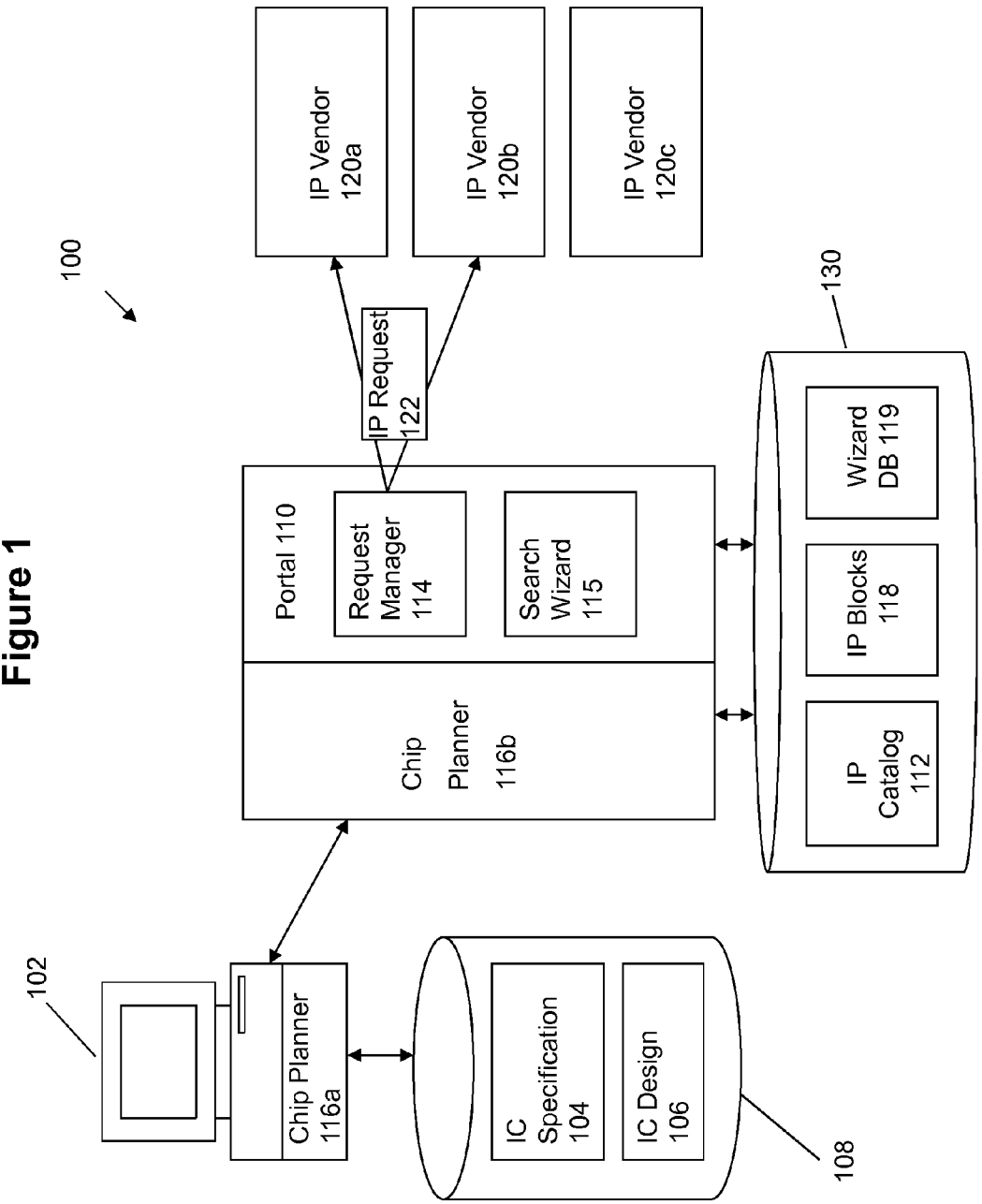

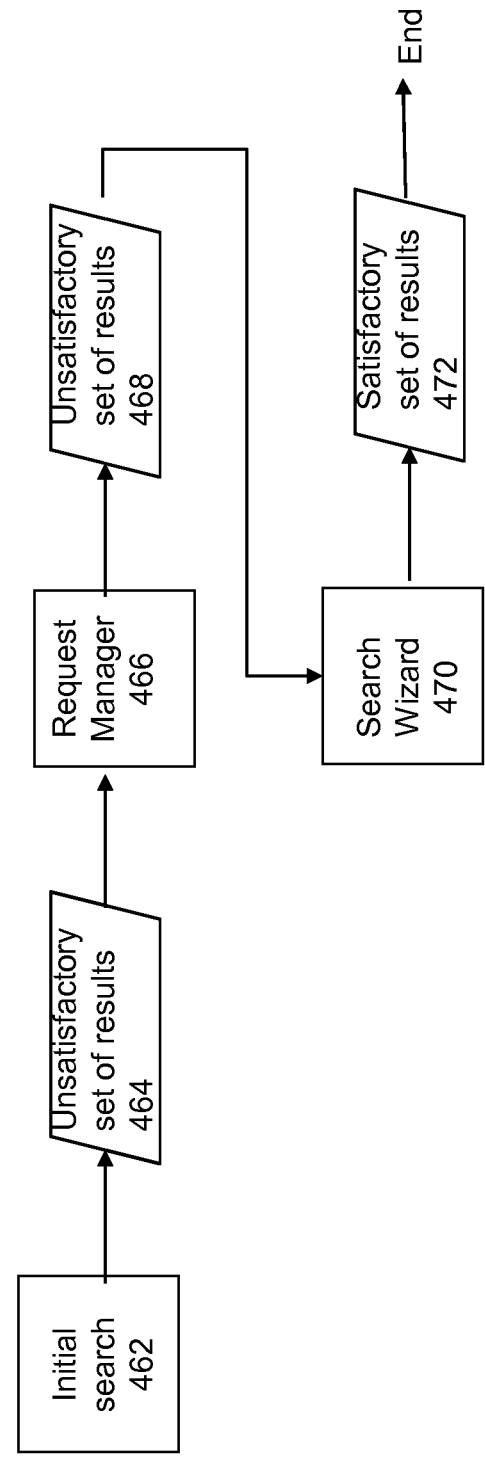

METHOD AND SYSTEM IDENTIFYING IP BLOCKS AND BLOCK SUPPLIERS FOR AN ELECTRONIC DESIGN

BACKGROUND

The invention is directed to an improved approach for designing, testing, and manufacturing integrated circuits.

A semiconductor integrated circuit (IC) has a large number of electronic components, such as transistors, logic gates, diodes, wires, etc., that are fabricated by forming layers of different materials and of different geometric shapes on various regions of a silicon wafer.

Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example.

An integrated circuit designer may use a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters.

In recent years, many designers of electronic systems have moved to a methodology known as Block Based Design ("BBD"), in which a system is designed by integrating a plurality of existing component design blocks. These pre-designed blocks may be obtained from internal design teams or licensed from other design companies. Moreover, pre-designed blocks may be developed to meet different design requirements and constraints. Many companies and organizations have created entire libraries of component design blocks and other units of electronic design (also referred to in the art as "intellectual property blocks", "IP blocks", "IP components", or "cores"), and have created businesses out of licensing or selling these IP blocks to other companies that use these design blocks to create an electronic product. There exist a large number of companies that supply such IP blocks to customers, and many thousands of such IP blocks available to be integrated into a customer's own design.

One of the significant challenges faced by a modern designer is that, given the large number of potential suppliers of IP blocks, how the designer can best and most efficiently identify which of the suppliers is able to provide an IP block that will suit the needs of the designer for a given design project. This is not a trivial problem given the existence of such a large number of vendors and suppliers of IP blocks and the even larger number of IP blocks that are available for licensing or purchase. The fact that certain hard macros are available on specific, predefined processes adds another layer of complexity in terms of IP selection.

SUMMARY

Some embodiments of the present invention provide an improved approach for identifying IP for an electronic design, and addresses the situation where there may be difficulties in identifying which, if any, IP blocks/vendors match the desired requirements of an electronic design for which the IP is to be used or integrated. According to some embodiments, a search wizard is provided to facilitate identification of IP for an electronic design. In some approaches, expert systems and expert system services are provided for identifying IP blocks for an electronic design. Concierge-like services may be used to facilitate a connection between a consumer of electronic IP and the provider or vendor of the electronic IP in conjunction with the expert services.

Other additional objects, features, and advantages of the invention are described in the detailed description, figures, and claims.

BRIEF DESCRIPTION OF FIGURES

FIG. 1 depicts an architecture of a system for locating and identifying IP according to some embodiments of the invention.

FIGS. 4A-D illustrate example searching sequences according to some embodiments of the invention.

DETAILED DESCRIPTION

Figure 2A:
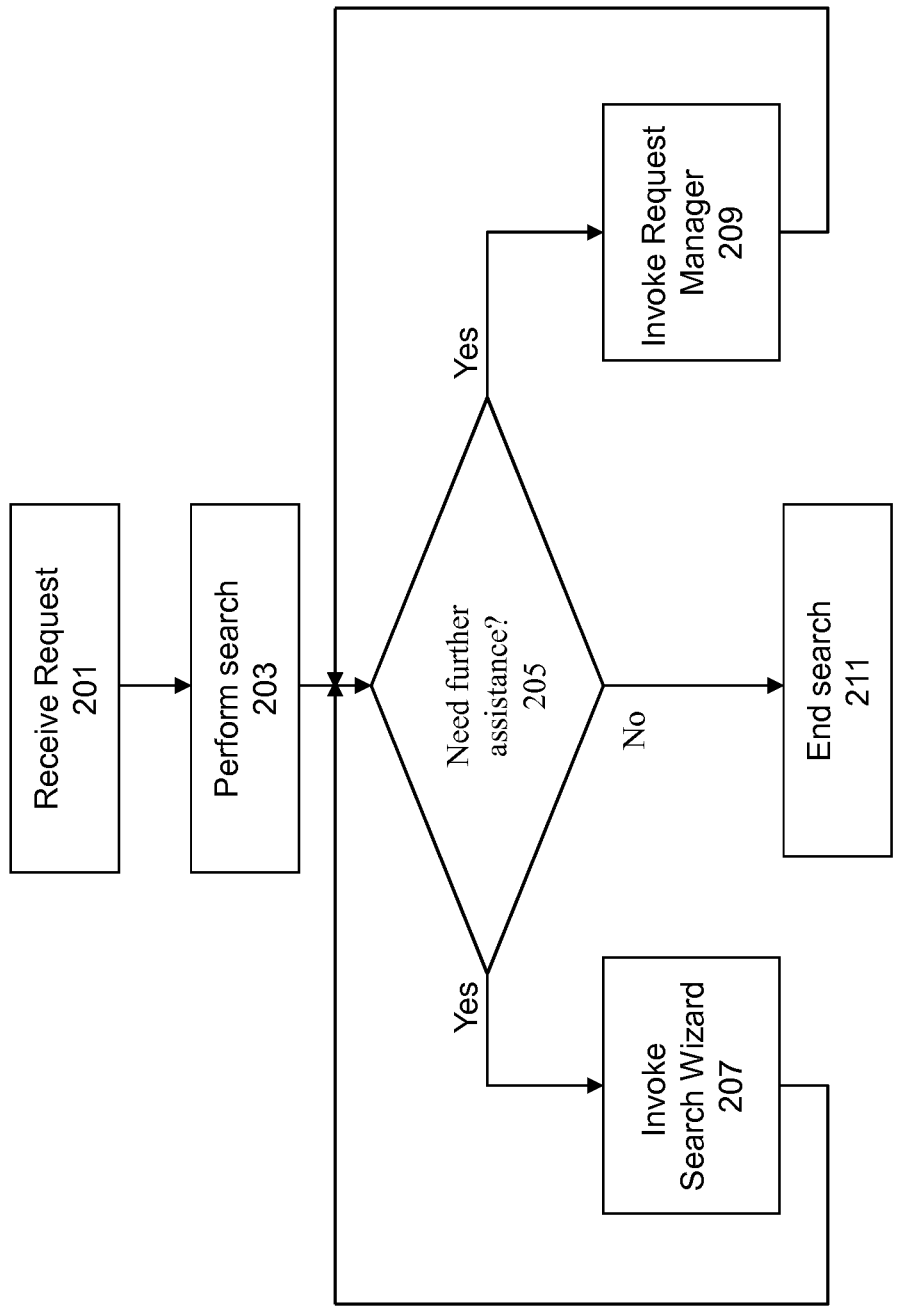
FIG. 2A shows a process for identifying IP according to some embodiments of the invention.

Some embodiments of the present invention provide an improved approach for identifying IP for an electronic design, and addresses the situation where there may be difficulties in identifying which, if any, IP matches the desired requirements of an electronic design for which the IP is to be used or integrated. According to some embodiments, a search wizard is provided to facilitate identification of IP for an electronic design. Even if the user cannot identify or locate the suitable IP or IP vendor on his or her own, the present approach provides a framework for walking a user or designer through a series of focused search steps to identify the IP or set of IP that may be appropriate for the IP consumer.

In some embodiments, expert systems and expert system services are provided for identifying IP blocks for an electronic design. Concierge-like services may be used to facilitate a connection between a consumer of electronic IP and the provider or vendor of the electronic IP in conjunction with the expert services.

FIG. 1 shows an architecture of a system 100 for facilitating identification of IP blocks according to one embodiments of the invention. System 100 comprises one or more users at one or more user stations 102 that access a portal 110 to research, identify, and/or obtain IP blocks. The users at user station 102 correspond to any individual, organization, or other entity that uses system 100 for locating IP blocks for either research purposes or to integrate the IP blocks in an electronic design 106. The use stations 102 could be implemented using any suitable platform. For example, user station 102 may be implemented as a remote workstation networked to the portal 110 across the internet, where the data from the portal 110 is configured and displayed using a web browser.

The user station 102 may be associated with a database 108 or other computer readable medium that holds a data regarding the user's electronic design 106 and/or one or more specifications 104 relating to the electronic design 106. The one or more specifications 104 comprise any set of information or parameters that the user has developed to determine the requirements of the user's electronic design 106 and of cells and blocks that are needed to implement the electronic design 106. For example, the specification could include details of requirements for one or more IP blocks for the electronic design 106, such as the function, process, technology node, size, acceptable power parameters, acceptable leakage parameters, and gate count of a desired IP block.

The portal 110 is a network-accessible site that facilitates access to a database 130 containing a catalog 112 of IP blocks 118 that are subject to purchase or licensing by the user at user station 102. The IP catalog 112 comprises a listing of the IP blocks 118 that have been registered at portal 110 by IP vendors 120a, 120b, and 120c. Based upon the specifications 104 developed by the user for the electronic design 106, the user at user station 102 will access portal 110 to search the IP catalog 112 for any IP blocks 118 that suitably correspond to the requirements of the specification 104.

The information in the IP catalog 112 regarding IP blocks 118 is provided by IP vendors 120a, 120b, and 120c. Each IP vendor 120a-c corresponds to a supplier of an item of IP that is listed in IP catalog 112, or is nevertheless registered as a source of IP even if not presently listing any items of IP in IP catalog 112.

The user that seeks to implement an electronic product and would like to obtain information about suitable IP 118 for the design 106 can access the IP catalog 112 from the portal 110. The user would search the IP catalog 112 using any suitable search criteria to obtain a list of IP blocks 118 that match the search criteria entered by the user. Based upon the search results, the user is provided with information relevant to making a decision to either license or purchase the IP block 118 for insertion into the user's design 106.

In certain embodiments, the user may also access a chip planner 116a or 116b (which may also be referred to as a "chip estimator"). The chip planner may be implemented with a chip planner client component 116b that resides at the user station 102 and/or a chip planner server component 116b that resides at a remote server/portal location. In some embodiment, the chip planner may be implemented as a web-based tool that resides at a server and is accessible using any web-enabled browser. The chip planner 116a-b provides a planning tool to plan, outline, and analyze the characteristics and production requirements of an electronic product. For example, the chip planner 116a-b could provide an early stage estimation of anticipated production characteristics to an electronic product by analyzing the specifications and requirements of an electronic design 106. By analyzing the functional and physical requirements of an electronic design 106, the chip planner 116a-b provides users with an estimate of the chip size, power, leakage and cost of the final electronic product.

This provides the users of the chip planner 116, such as IC design teams, system architects and management, with the ability to visualize tradeoffs throughout the chip design flow. By bringing IP and manufacturing data to bear on the earliest stage of chip planning, the chip planner 116 enables earlier and more informed decision-making in the context of critical decisions affecting chip performance, functionality and cost. The chip planner 116 helps design teams explore a wide range of chip architecture options in literally seconds including selection of IP, technology nodes and processes, power optimization strategies, packaging and much more.

In operation, the user at user station 102 provides the chip planner 116 with a high-level design specification 104, including information such as gate counts, performance goals, off-chip bus connections, memory configurations and optional connectivity. The user will then select IP 118 to be considered either by importing IP from the user's own collection or by searching the IP catalog 112. Based upon these parameters, the chip planner 116a-b will produce a datasheet with estimations of the final silicon product, including information such as die area, performance, power, leakage, yield, package recommendations, and production chip cost.

It is quite possible that either the user at user station 102 or the chip planner 116a-b performs a search of the IP catalog 112 for a specific item of IP to match certain requirements needs by the user for design 106, but will be unable to identify an IP block 118 that matches the user's requirements. This may be because the IP vendors 120a-c have not yet registered any IP at the IP catalog 112 that corresponds to the user's search criteria. This may also be because the user's search has returned so many items in a large list that it is very difficult or impossible for the user to efficiently determine which of the IP on the lengthy list best suits the user's needs.

U.S. Pat. No. 8,156,453 describes a method and system for connecting suppliers and consumers of IP blocks together, where concierge-like services are provided to facilitate a connection between a consumer of electronic IP and the provider or vendor of the electronic IP. Even if the user cannot identify or locate the suitable IP or IP vendor on his or her own, the present invention provides a framework for establishing communications between the consumer and any appropriate IP vendors for the requested IP. In this approach, a request manager 114 is implemented, e.g., at the portal 110. The request manager 114 is responsible for accepting user requests, and for sending IP requests 122, as appropriate, to one or more of the IP vendors 120a-c. As described below, any suitable processing mechanism can be employed to determine which, if any, of the IP vendors 120a-c should be contacted with the IP request 122. The IP vendor that has an unregistered IP that can match to the IP request can then act upon the IP request 122 by contacting the user at user station 102 or can suggest an item of registered IP 118 that will fulfill the user's requirements. The contact message to the IP vendors 120a-c can be displayed on a display device and/or stored in a computer readable medium for storage and retrieval. U.S. Pat. No. 8,156,453 is hereby incorporated by reference in its entirety.

Embodiments of the present invention further provide a search wizard 115 to facilitate identification of IP for an electronic design. The search wizard 115 provides a framework for walking a user or designer through a series of focused search steps to identify the IP or set of IP that may be appropriate for the IP consumer. For example, a series of targeted questions can be posed to the user by the search wizard 115, which focuses the user and the system to identify the exact set of requirements for the IP sought by the user, and hence permits easy and efficient identification of the IP blocks 118 within the IP catalog 112 that would fit the user's requirements.

A wizard database 119 may contain a knowledgebase of question and analysis rules to facilitate the search and identification processing. In some embodiments, the search wizard may be implemented as an expert system for identifying the IP blocks 118.

The concierge-like services provided by the request manager 114 may be used in conjunction with the search wizard 115 to facilitate identification of the appropriate IP or IP vendor. For example, if the response to an initial search query produces too many results from the IP catalog, the search wizard 115 can be used to narrow and reduce the list of results before turning to the concierge services of the request manager 114. Similarly, if the initial search turns up zero or too few results, then the search wizard 115 can be used to increase the list of possible results before using the concierge services of the request manager 114 to contact the IP vendors.

FIG. 2A shows a flowchart of a process for identifying IP according to some embodiments of the invention. At 201, an initial search term/request is received for identification of IP for an electronic design. The initial search term/request may be in any form that is suitable for conveying the nature of the IP being requested. For example, a search field can be provided in a user interface (UI) for entry of a search term for the request. A 203, a search is performed using one or more search terms. In some embodiment, this search comprises a keyword, category, and/or subject search of an IP catalog.

A determination is made at 205 whether further assistance is needed by the user as a result of the search. For example, if the user performs a search of the IP catalog, and the search fails to identify any IP that matches the user's search criteria, then further assistance may be needed by the user at that point to identify relevant IP blocks and/or IP block suppliers. Similarly, if the initial search uses a general term that results in an overwhelming large number of search results, then the user may need further assistance to help reduce that large list of results to a much smaller list of items.

If the search results are satisfactory and/or the user does not need any further assistance, then the process ends at 211. If the user needs further assistance, then either the search wizard is invoked at 207 and/or the request manger is invoked at 209. As described in more detail below, the invocation of the search wizard at 207 initiates a series of focused questions to guide the user into providing sufficient information to more accurately identify the potential IP of interest.

The invocation of the request manager at 209 generates an IP request message to be sent to IP vendors that are likely to provide the IP relevant to the use's electronic design, e.g., if the chip planner attempts to perform estimation functionality by identifying an IP block or cell in its library which is needed to model the user's design, but the necessary cell or block is not available, then an IP request message can be generated for one or more IP vendors that corresponds to the necessary cell or block. The IP request may be in any form that is suitable for conveying the nature of the IP being requested. For example, the request could be implemented as an email message from the user which includes a message portion identifying the type of IP being requested. The message portion could include a text box that allows the user to insert a text description of the IP being sought. Alternatively, the request message interface could be structured to include pre-defined categories or lists of IP and parameters with selection boxes that can be "clicked" or otherwise selected by the user to more specifically define the characteristics of the IP being sought. A search field can also be provided in a user interface (UI) for entry of a search term for the request.

It is noted that multiple iterations of the flow may be needed to identify a list of IP blocks and/or IP vendors for the user. In addition, the multiple iterations may invoke both the search wizard and the concierge services of the request manager. For example, a large list of initial search results may be used by an earlier invocation of the search wizard to narrow the list of results to a smaller subset of IP vendors, which is then passed to subsequent invocation of the request manager to generate an IP request message to be sent to the identified IP vendors.

In the typical scenario for the search wizard in some embodiments, a series of questions are provided to the user, where the answer to an earlier question is used to identify the appropriate subsequent question as a follow-up question. The entire sequence of questions provides an approach to generate an incrementally smaller list of potential IP blocks and/or IP vendors along each step of the sequence of questions, with the goal to obtain a manageable list of possible IP blocks at the end of the entire sequence.

Figure 2B:
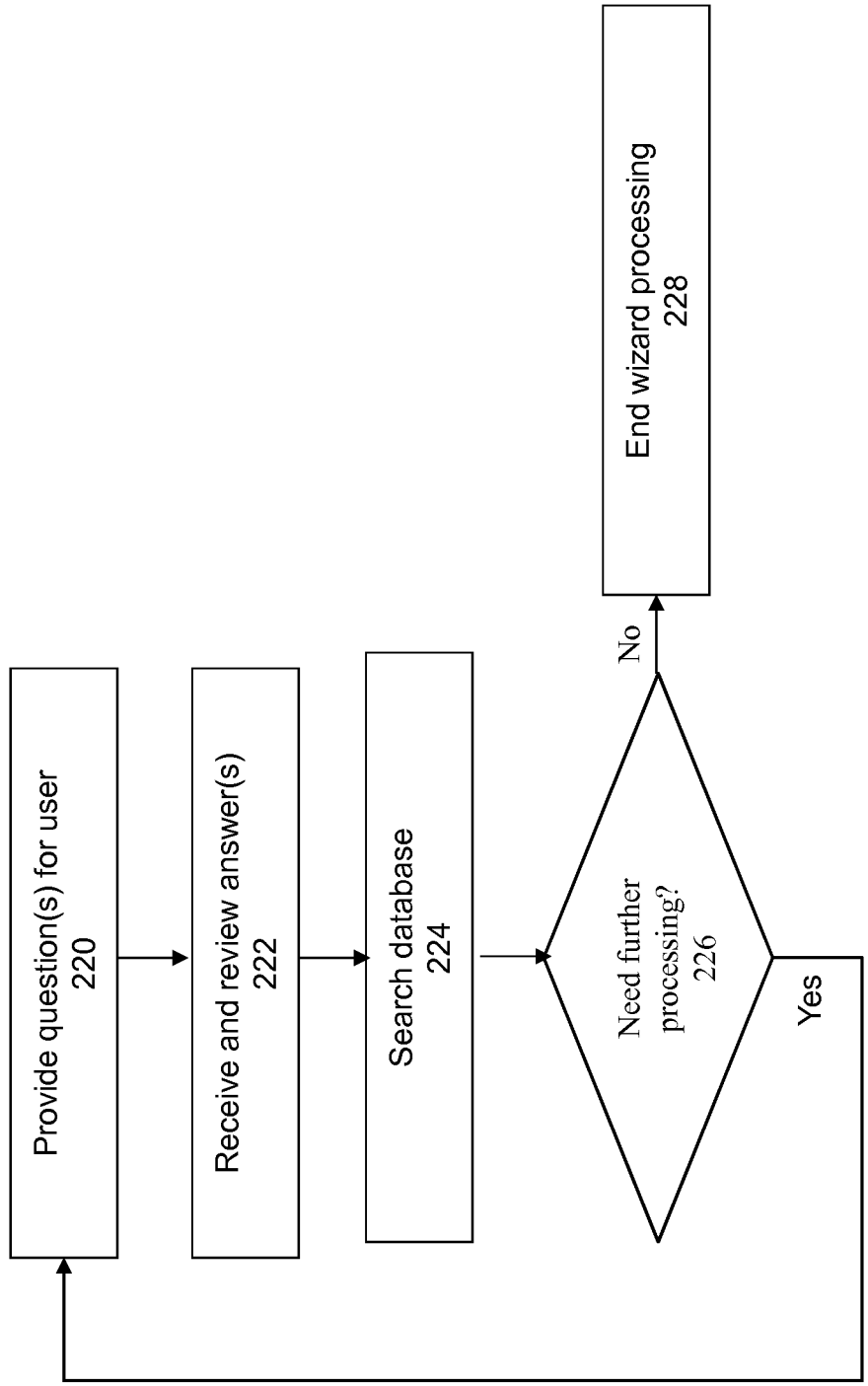
FIG. 2B shows a process for using a search wizard to identify IP according to some embodiments of the invention.

FIG. 2B is a flowchart of a process for implementing a search wizard according to some embodiments of the invention. At 220, one or more questions are posed to the user to obtain information about the IP needed by the user. These questions are obtained from a search database/knowledgebase, where the database/knowledgebase includes a list of questions pertaining to IP block identification, along with rules pertaining to follow-up questions that should be asked in response to earlier questions.

At 222, the user's answers are received and processed by the search wizard. These answers are processed by an engine at the search wizard for use in searching the database at 224. Multiple types of searching may occur. One type of searching is to search the IP catalog to identify IP blocks/vendors that match the criteria identified by the user as being suitable for the user's electronic design. Another type of searching is to determine whether the database contains any appropriate follow-up questions that should be asked to the user. An inference engine may be utilized to perform the analysis of the user's answers and to perform a search/analysis of the knowledgebase.

At 226, a determination is made whether further processing is needed. At this point, an adequate list of IP may have been identified from the search step 224. Therefore, no further processing is needed by the search wizard (228). In addition, the search wizard may end its processing to perform a handoff to concierge processing by the request manager (e.g., if there are zero results from the search).

On the other hand, it is possible that further processing is needed by the search wizard, which would result in the process returning back to 220 for further processing. For example, the search wizard and/or user may determine that additional questions are needed to further refine the list if IP blocks identified by the search step 224, e.g., if the list of identified IP blocks is too large and needs to be further filtered to a smaller list.

Figure 2C:
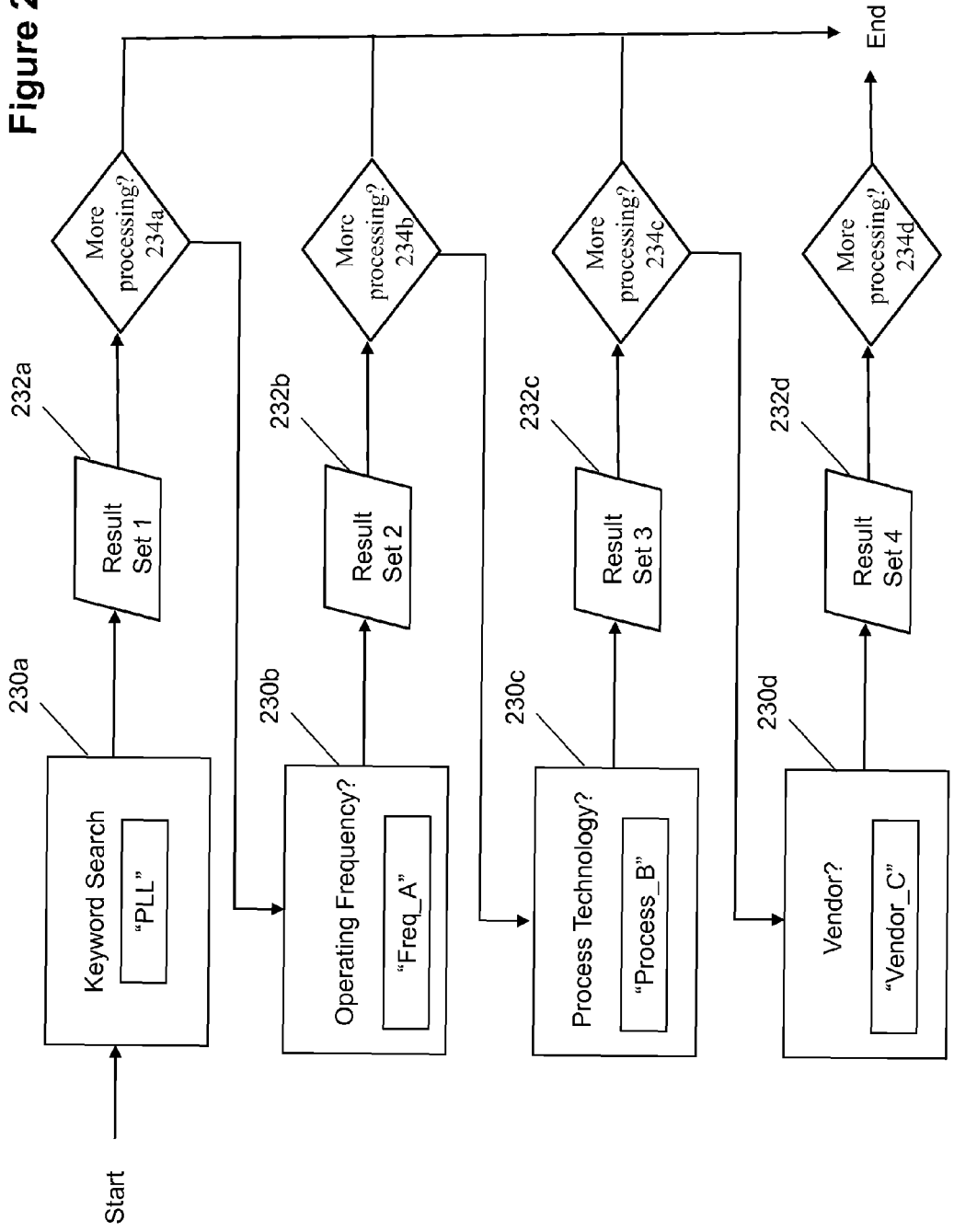
FIG. 2C shows an example sequence of questions that may be posed by the search wizard.

FIG. 2C shows an example sequence of questions that may be posed by the search wizard. At 230*a*, the original keyword for the search request is received, which in this example is "PLL". Searching may be produced using this keyword, producing a first result set 232*a*. A determination is made at 234*a* whether additional processing is needed at this point. For example, the inference engine and/or analysis of the search results 232*a* may result in a conclusion that additional processing is needed, e.g., because there are too many search hits in the IP catalog from just searching upon the "PLL" keyword.

As such, additional processing is performed. Therefore, at 230b, a follow-up question is retrieved from the database to be asked to the user. For example, the follow-up question may be to ask about the desired operating frequency for the PLL circuit. The answer to the follow-up question is used to perform another search of the database to generate another result set 232b. A determination is made at 234b whether additional processing is needed, e.g., because there are still too many search hits in the IP catalog from just searching upon both the "PLL" keyword and the answer to the "operating frequency" question.

Therefore, even more processing can be performed. At 230c, another follow-up question is retrieved from the database to be asked to the user in the sequence of questions. For example, the follow-up question may be to ask about the desired process technology for the PLL circuit. The answer to the follow-up question is used to perform another search of the database to generate another result set 232c. Yet another determination is made at 234c whether additional processing is needed, e.g., because there are still too many search hits in the IP catalog from just searching upon the "PLL" keyword, the answer to the "operating frequency" question, and the answer to the "process technology question". If more processing is required, then at 230d another follow-up question is retrieved from the database to be asked to the user in the sequence of questions. For example, the additional follow-up question may be to ask about specific IP vendors for the desired IP block. The answer to the follow-up question is used to perform another search of the database to generate another result set 232d. Another determination is made at 234d whether additional processing is needed.

This sequence of asking pertinent follow-up questions and receiving additional answers continues until the list of IP for the search results is refined to an acceptable list of results (and/or until search wizard processing is no longer needed for other reasons such as when there are zero expected search results). At that point, processing of the search wizard ends.

Figure 3A:
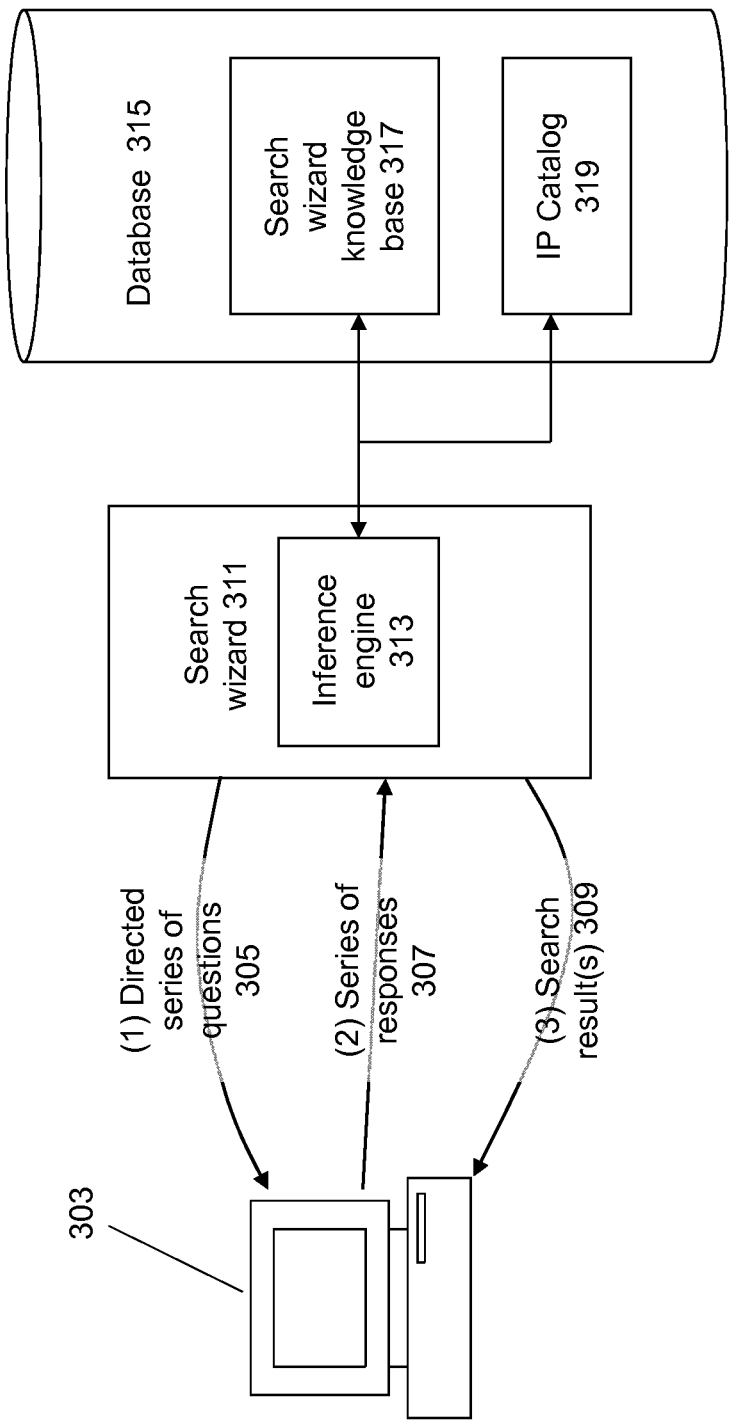
FIG. 3A illustrates an architecture for using a search wizard for identification of IP for an electronic design according to some embodiments of the invention.

FIG. 3A provides an illustration of the architecture of a system to implement a search wizard 311 according to some embodiments of the invention. The architecture includes a user station 303 accessed by the user to utilize the search wizard 311. The architecture further includes a database 315 having an IP catalog 319 to hold information about IP blocks and IP vendors.

This example architecture is configured such that an expert systems framework is used to implement the search wizard 311. As a result, the search wizard 311 includes an inference engine 313 that utilizes a knowledgebase 317 to perform its processing. The inference engine 313 is a mechanism that performs a reasoning process using a set of processing rules. Examples of logic processing that may be performed by the inference engine includes propositional logic, predicates of order 1 or more, epistemic logic, modal logic, temporal logic, and fuzzy logic.

The knowledgebase 317 comprises a set of data from which analysis results may be inferred using input from the user answers. Therefore, the knowledgebase 317 may include a set of data expressed as a collection of IF . . . THEN formulations that are used by the inference engine to make conclusions regarding the IP blocks and/or IP vendors. The clauses within the IF . . . THEN formulations correspond to the questions and the question sequences that are asked to the user.

In some embodiments, the knowledgebase 317 improves over time, since prior search results are used to improve future searching. A learning process is employed to refine the data within the knowledgebase 317 to account for the prior search results. This permits additional data to be added to the knowledgebase. In addition, this learning process permits modification of existing data in the knowledgebase to correct any inaccuracies or to make corrective refinements.

Figure 3B:
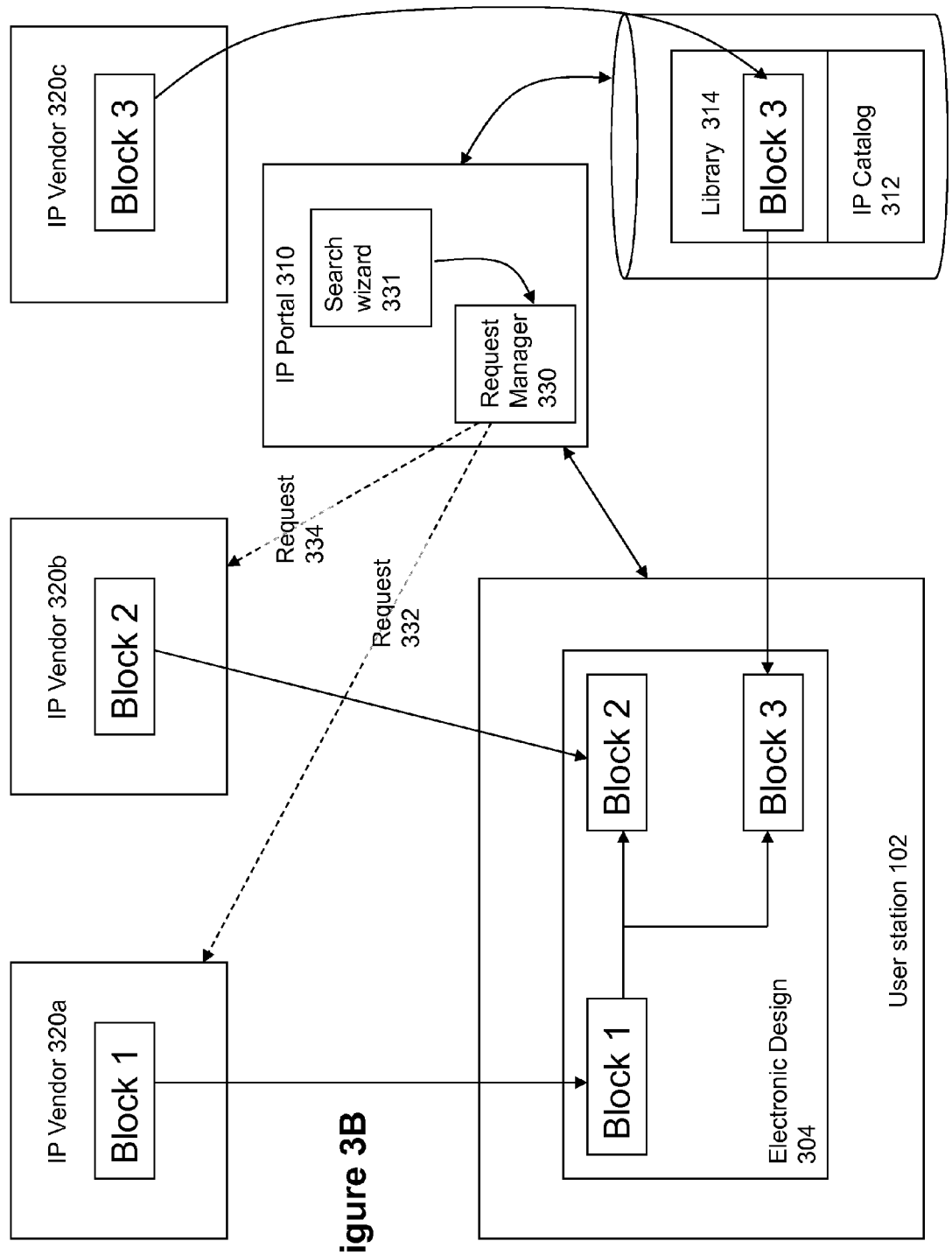
FIG. 3B illustrates an architecture for using a search wizard and a request manager for identification of IP for an electronic design according to some embodiments of the invention.

FIG. 3B illustrates how the search wizard can be used in conjunction with the concierge services of a request manager according to some embodiments of the invention. Assume that a user at user station 302 seeks to implement an electronic design 304 that includes three IP blocks 1, 2, and 3. Further assume that the user does not have either the expertise or motivation to implement blocks 1, 2, or 3. Instead, the user is motivated to purchase or license these IP blocks from commercial IP vendors.

The user will access IP portal 310 in an effort find suitable IP from commercial IP vendors that are suitable for the user's design requirements. In particular, the user will search the IP catalog 312 using search criteria that correspond to the desired characteristics of IP blocks 1, 2, and 3.

Assume that the user has used the search wizard 331 to search the IP catalog and to identify relevant IP blocks/vendors, and the result results from the IP catalog reveals a suitable candidate for the IP block 3 from IP vendor 320c, the details of which exist in library 314. At this point, the user can purchase or license block 3 from the IP vendor 320c that has registered this IP block at portal 310. The IP block 3 can be directly retrieved from the IP vendor 320c or retrieved from the library 314.

Assume further that the search wizard 331 cannot identify any suitable candidates for IP blocks 1 and 2. At this point, the search wizard can hand-off processing to the request manager 330. The request manager 330 at portal 310 will send an IP request 332 corresponding to block 1 and an IP request 334 for IP block 2 to a designated list or lists of IP vendors in an effort to locate an IP vendor that can provide the requested IP to the user.

In this example scenario, at least two IP vendors 320a and 320b have chosen to respond to the IP requests 332 and 334. In particular, IP vendor 320a has responded to the IP request 332 for block 1 and IP vendor 320b has responded to the IP request 334 for block 2. In a more realistic scenario, there are likely to be multiple IP vendors that respond to the sales lead inherent in the IP requests, thereby providing the user with multiple possible choices of vendors and IP blocks to choose from. The user can thereafter engage in a commercial transaction with these IP vendors 320a and 320b to either purchase or license the IP blocks 1 and 2 to integrate into the user electronic design 304.

In some embodiments, only certain ones of the registered IP vendors are eligible to receive requests for IP blocks and/or are identified by the search wizard. There are many reasons for limiting the number of IP vendors for searching and/or requests. One reason is that it is of great benefit to the IP vendor to be eligible for searching and/or receive a message regarding a request from a potential customer for IP, since this provides a very significant and potentially a profitable sales lead for the IP vendor. Therefore, the operator of the IP request manager may limit the list of eligible IP vendors to only those IP vendors that have provided sufficient compensation to the portal site operator. There are numerous ways to accomplish this. For example, the site operator may establish different tiers or levels of membership for registered IP vendors, where only the higher level tiers (at greater membership costs) are eligible. According to some embodiments, all IP vendors that meet this eligibility requirement will receive the forwarded IP request message and/or be available for the search wizard. Another possible approach is auction or sell the right only to those IP vendors that have paid or bid enough for receiving the requests and/or searching, e.g., based upon sale of keywords. Yet another approach is to provide different pricing plans, where the pricing plans provide for receiving different numbers of IP requests/searches based upon paying at different price points.

Filtering may be optionally applied to narrow the list of IP vendors that receive the IP request from the user and/or are identified by the search wizard. The filtering may be performed on a subject matter basis, where lists of IP vendors are maintained for each designated type of subject matter or other filtering parameter for requests. Keywords may be identified from the request based upon a review of the IP request. Alternatively, the user may have specified one or more relevant subject matters when generating the IP request. For example, it may be determined that the IP request is for an IP block to perform PLL functionality. To filter the list of IP vendors in this circumstance, a list of IP vendors may be maintained that only include the IP vendors corresponding to PLL-related IP, where all other vendors will be filtered out based upon the presence of the PLL criteria in the IP request. The lists of IP vendors can be maintained based upon self-inclusion by vendors, historical expertise, and/or established presence of the IP vendors in particular areas. Any design, functionality, or process related criteria may be used to filter the request.

In addition, the IP vendors may provide compensation to the site operator to be included onto the filtering lists of the different subject matters. For example, the IP vendors may choose to purchase inclusion on the filtering lists on a per-list basis, with the specific lists to be selected by the IP vendors. Alternatively, the IP vendors may purchase a membership with the site operator, where the membership grants the IP vendor the right to be included on a designated number of filtering lists, with extra charges required to be listed on a greater number of filtering lists.

Figure 4A:
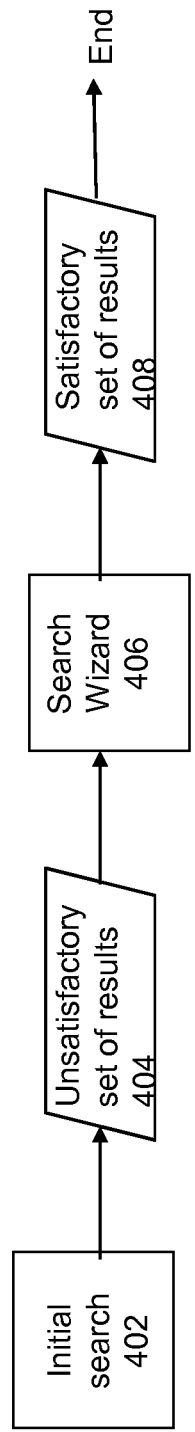

Different processing sequences may be performed according to various embodiments of the invention. FIG. 4A shows a first example situation in which an initial search at 402 produces a first unsatisfactory result set 404. However, processing with a search wizard at 406 produces a satisfactory result set 408, allowing processing to end.

Figure 4B:
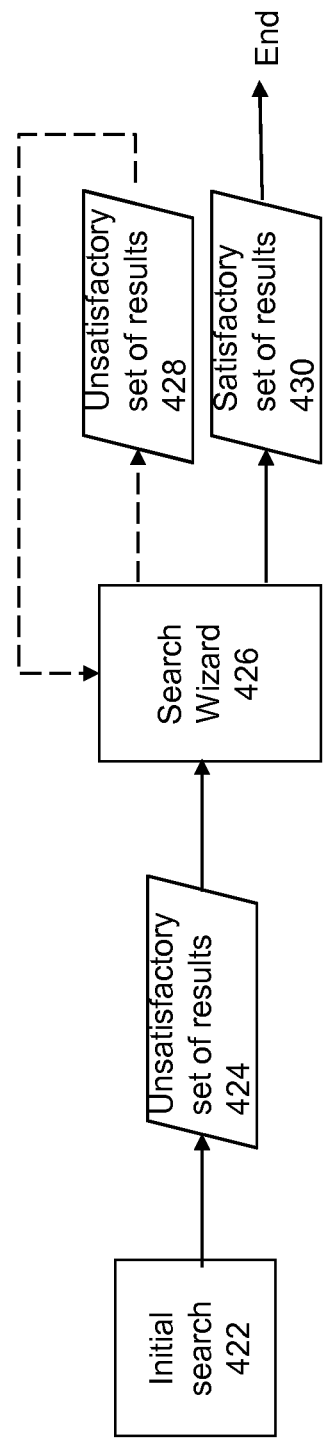

FIG. 4B shows a second example situation, in which the initial search at 422 produces a first unsatisfactory result set 424, followed by search wizard processing at 426. However, the search results 428 from the search wizard may be unsatisfactory. Therefore, additional processing may be required to improve the search results. In this example, the additional processing consists of a loop back to 426 to continue the search wizard processing until a satisfactory set of results 430 is generated.

Figure 4C:
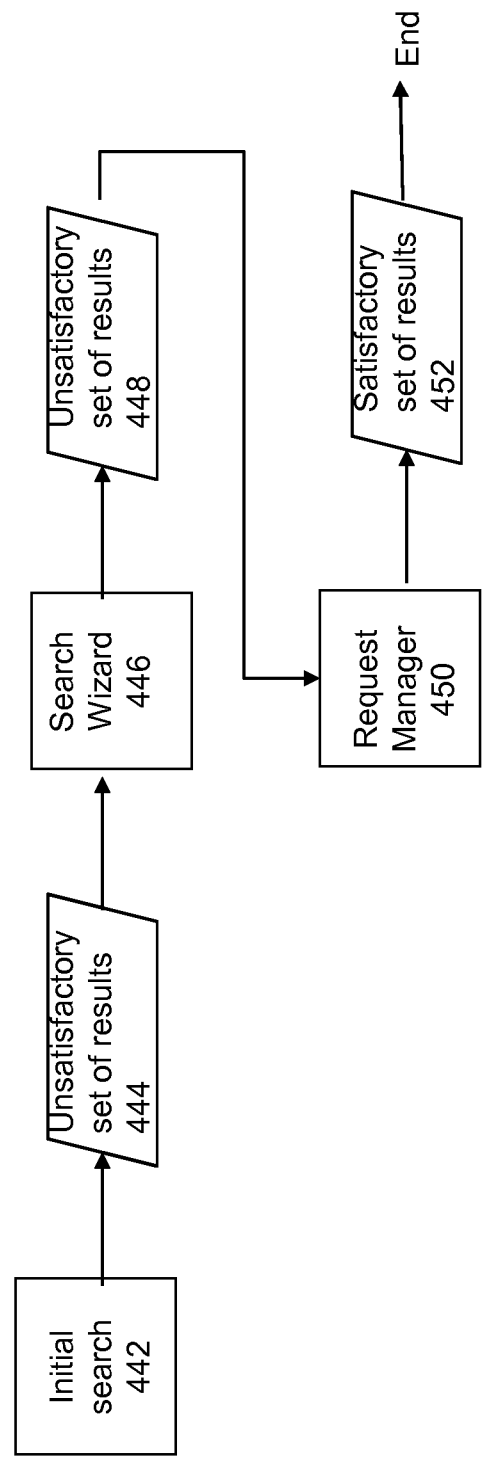

FIG. 4C shows another example situation, in which the initial search at 442 produces a first unsatisfactory result set 444, followed by search wizard processing at 446 that produces search results 448 that may be unsatisfactory. Therefore, additional processing may be required to improve the search results. In this example, the additional processing consists of a hand-off to the request manager 450 to perform concierge-like processing to generate a satisfactory set of results 452.

FIG. 4D shows an alternative example situation, in which the initial search at 462 produces a first unsatisfactory result set 464, followed by request manager processing at 466 that produces search results 468. Additional processing may be required to improve the search results, which consists of a hand-off to the search wizard 470 to generate a satisfactory set of results 472.

Therefore, what has been described is an improved approach for identifying IP for an electronic design. The present approach can be used to handle situation where there may be difficulties in identifying which, if any, IP matches the desired requirements of an electronic design for which the IP is to be used or integrated. The search wizard of the present approach facilitates identification of IP for an electronic design, where in some embodiments, expert systems and expert system services are provided for identifying IP blocks for an electronic design. Concierge-like services may be used to facilitate a connection between a consumer of electronic IP and the provider or vendor of the electronic IP in conjunction with the expert services.

System Architecture Overview

Figure 5:
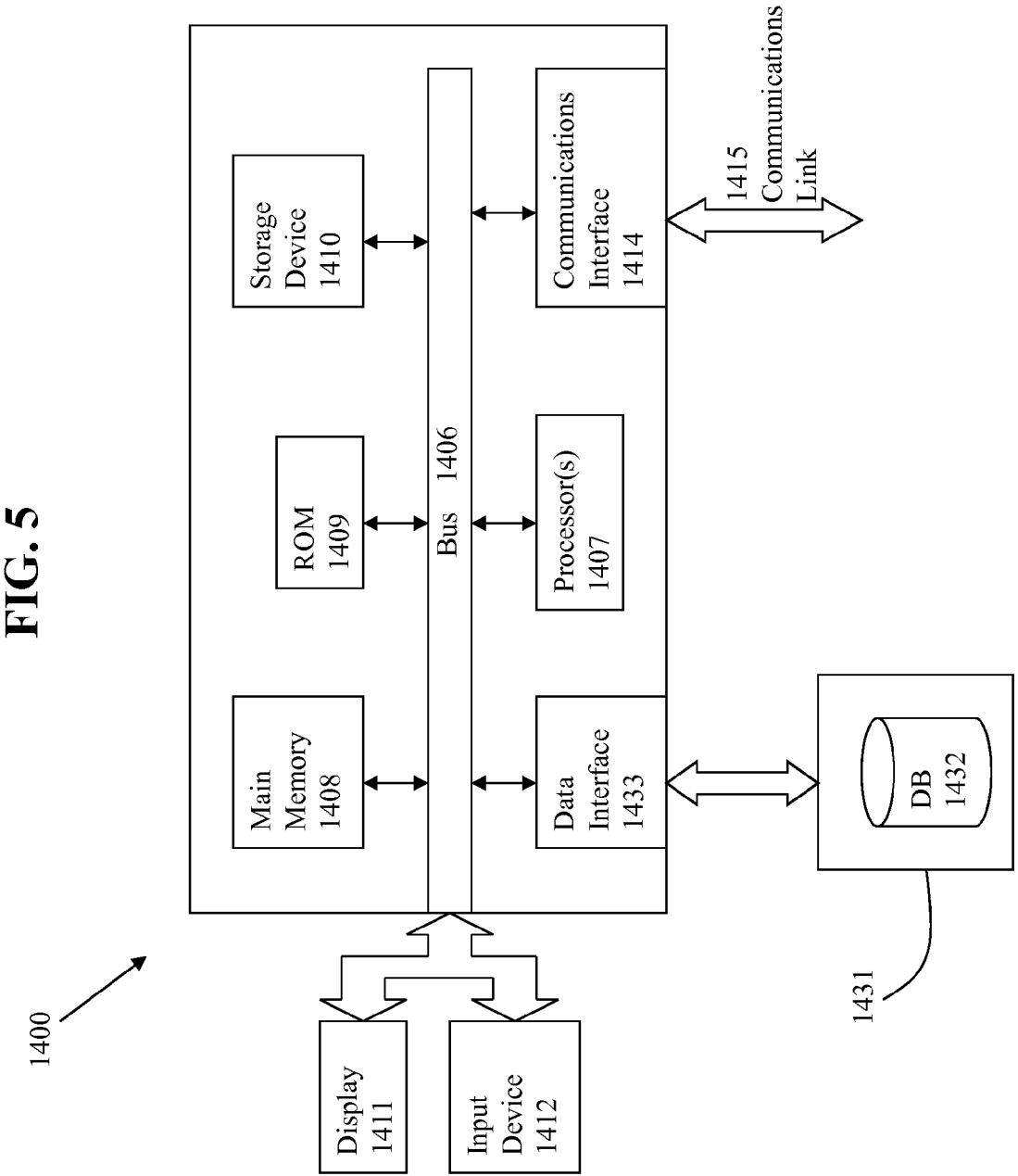
FIG. 5 shows an architecture of an example computing system with which the invention may be implemented.

FIG. 5 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for locating an IP component for an electronic design, comprising:
    performing a search of an IP catalog for an IP component that is to be used in a block-based implementation of an electronic design, wherein the IP component complies with a set of component requirements to be used within the electronic design;
    determining that there is an inability to identify a candidate IP component from the IP catalog that suitably corresponds to the set of component requirements for the IP component;
    based at least in part upon determining that there is the inability to identify the candidate IP component from the IP catalog that suitably corresponds to the set of component requirements for the IP component, using an expert system to provide a set of questions; and
    using the set of questions to infer the candidate IP component from the IP catalog to be integrated into the electronic design, wherein the expert system uses an answer to a first question in the set of questions to determine a second question in the set of questions.

2. The method of claim 1 in which an inference engine is used to use the set of questions to infer the candidate IP component from the IP catalog.

3. The method of claim 2 in which a knowledge base is accessed by the inference engine to identify the set of question to be asked.

4. The method of claim 3 in which the knowledge base is updated using results of prior searches.

5. The method of claim 1 in which the set of questions comprises a series of targeted questions that filters information from the IP catalog using responses.

6. The method of claim 1 in which the set of questions comprises a series of targeted questions, where a succeeding question is based at least in part on an earlier response.

7. The method of claim 1 in which a concierge service is accessed using results from inferring the candidate IP component.

8. The method of claim 1 in which the search for the IP component is based upon performance of chip planning for the electronic design, wherein the chip planning is to obtain expected characteristics or production requirements for the electronic design.

9. The method of claim 1 in which the inability to identify the candidate IP component is based upon zero matching IP components in the IP catalog or too many IP components being returned from the search of the IP catalog.

10. The method of claim 1 in which the candidate IP component is identified based at least in part upon whether a IP supplier corresponding to the candidate IP component belongs to one or more membership tiers.

11. The method of claim 1 in which the candidate IP component is identified based at least in part upon whether a IP supplier corresponding to the candidate IP component has purchased rights to be included in a search result.

12. The method of claim 1 in which the candidate IP component is identified based at least in part upon whether a IP supplier corresponding to the candidate IP component satisfies filtering of IP suppliers for technology or keywords associated with the IP suppliers.

13. The method of claim 12 in which the IP suppliers provide compensation to be associated with the technology or the keywords.

14. A system for locating an IP component for an electronic design, comprising:
    a non-transitory computer readable storage medium comprising an IP catalog having information about one or more IP components that are available for purchase or licensing;
    a portal site available to be used to perform a search of the IP catalog for an IP component that is to be used in block-based implementation of an electronic design, wherein the IP component complies with a set of component requirements to be used within the electronic design; and
    a search wizard comprising executable computer code, which when executed with a processor, uses an expert system to provide a set of questions and uses the set of questions to infer the candidate IP component from the IP catalog to be used in the block-based implementation of the electronic design, wherein the expert system uses an answer to a first question in the set of questions to determine a second question in the set of questions.

15. The system of claim 14 in which the search wizard comprises an inference engine to use the set of questions to infer the candidate IP component from the IP catalog.

16. The system of claim 14 in which the search wizard accesses a knowledge base to identify the set of question to be asked.

17. The system of claim 16 in which the knowledge base is updatable using results of prior searches.

18. The system of claim 14 in which the set of questions comprises a series of targeted questions that filters information from the IP catalog using responses.

19. The system of claim 14 in which the set of questions comprises a series of targeted questions, where a succeeding question is based at least in part on an earlier response.

20. The system of claim 14, further comprising a request manager to perform a concierge service using results from the search wizard.

21. The system of claim 14, further comprising a chip planner that performs chip planning for the electronic design, wherein the chip planning is to obtain expected characteristics or production requirements for the electronic design.

22. The system of claim 14, in which the computer readable medium holds information regarding whether a IP supplier corresponding to the candidate IP component belongs to one or more membership tiers, and the information is used to identify the candidate IP component.

23. The system of claim 14, in which the computer readable medium holds information regarding whether a IP supplier corresponding to the candidate IP component has purchased rights to be included in a search result, and the information is used to identify the candidate IP component.

24. The system of claim 14, in which the computer readable medium holds information regarding whether a IP supplier corresponding to the candidate IP component satisfies filtering of IP suppliers for technology or keywords associated with the IP suppliers, and the information is used to identify the candidate IP component.

25. The system of claim 24 in which the IP suppliers provide compensation to be associated with the technology or the keywords.

26. A computer program product embodied on a non-transitory computer usable medium, the non-transitory computer useable medium having stored thereon a sequence of instructions which, when executed by a processor causes the processor to execute a method for locating an IP component for an electronic design, the method comprising:
    performing a search of an IP catalog for an IP component that is to be used in a block-based implementation of an electronic design, wherein the IP component complies with a set of component requirements to be used within the electronic design;
    determining that there is an inability to identify a candidate IP component from the IP catalog that suitably corresponds to the set of component requirements for the IP component;
    based at least in part upon determining that there is the inability to identify the candidate IP component from the IP catalog that suitably corresponds to the set of component requirements for the IP component, using an expert system to provide a set of questions; and
    using the set of questions to infer the candidate IP component from the IP catalog to be integrated into the electronic design, wherein the expert system uses an answer to a first question in the set of questions to determine a second question in the set of questions.

27. The computer program product of claim 26 in which an inference engine is used to use the set of questions to infer the candidate IP component from the IP catalog.

28. The computer program product of claim 27 in which a knowledge base is accessed by the inference engine to identify the set of question to be asked.

29. The computer program product of claim 28 in which the knowledge base is updated using results of prior searches.

30. The computer program product of claim 26 in which the set of questions comprises a series of targeted questions that filters information from the IP catalog using responses.

31. The computer program product of claim 26 in which the set of questions comprises a series of targeted questions, where a succeeding question is based at least in part on an earlier response.

32. The computer program product of claim 26 in which a concierge service is accessed using results from inferring the candidate IP component.

33. The computer program product of claim 26 in which the search for the IP component is based upon performance of chip planning for the electronic design, wherein the chip planning is to obtain expected characteristics or production requirements for the electronic design.

34. The computer program product of claim 26 in which the inability to identify the candidate IP component is based upon zero matching IP components in the IP catalog or too many IP components being returned from the search of the IP catalog.

35. The computer program product of claim 26 in which the candidate IP component is identified based at least in part upon whether a IP supplier corresponding to the candidate IP component has purchased rights to be included in a search result.

36. The computer program product of claim 26 in which the candidate IP component is identified based at least in part upon whether a IP supplier corresponding to the candidate IP component satisfies filtering of IP suppliers for technology or keywords associated with the IP suppliers.

37. The computer program product of claim 36 in which the IP suppliers provide compensation to be associated with the technology or the keywords.

\* \* \* \* \*